(12) United States Patent
Hughes

(10) Patent No.: US 7,415,769 B2
(45) Date of Patent: Aug. 26, 2008

(54) VEGETABLE PEELER WITH PIVOTING HEAD

(75) Inventor: W. Scott Hughes, Chicago, IL (US)

(73) Assignee: Rubbermaid Incorporated, Huntersville, NC (US)

( * ) Notice: Subject to any disclaimer, the term of this patent is extended or adjusted under 35 U.S.C. 154(b) by 380 days.

(21) Appl. No.: 10/891,670

(22) Filed: Jul. 15, 2004

(65) Prior Publication Data

US 2005/0028384 A1 Feb. 10, 2005

Related U.S. Application Data

(60) Provisional application No. 60/493,553, filed on Aug. 8, 2003.

(51) Int. Cl.
*B26B 29/00* (2006.01)
*A47J 17/00* (2006.01)

(52) U.S. Cl. .................. 30/321; 30/279.6; 30/280; 30/283; 15/111; 15/236.05; 99/584; 99/588

(58) Field of Classification Search ............ 30/321, 30/339, 161, 330, 171–172, 279.6, 280, 304, 30/123.5, 283, 278, 315, 239, 142, 149, 123.7, 30/114, 138, 279.2, 299, 303, 527, 532, 539, 30/540; 99/584, 538, 588–591, 542–545, 99/537, 567; 15/236.05, 236.08, 105; 7/105, 7/170; 451/557, 558; D7/695

See application file for complete search history.

(56) References Cited

U.S. PATENT DOCUMENTS

| | | | | |
|---|---|---|---|---|
| 632,072 A * | 8/1899 | Thutber | ........................ | 30/321 |
| 713,979 A * | 11/1902 | Galipeau | ...................... | 30/171 |
| 1,500,643 A * | 7/1924 | Scalbom | ...................... | 30/321 |
| 2,285,567 A * | 6/1942 | Carroll | ...................... | 30/121.5 |
| 3,942,249 A * | 3/1976 | Poehlmann | ................... | 30/160 |
| 4,233,737 A * | 11/1980 | Poehlmann | ................... | 30/335 |
| 4,541,175 A * | 9/1985 | Boyd et al. | .................... | 30/161 |
| 4,617,736 A * | 10/1986 | McCrary | ...................... | 30/169 |
| 5,093,991 A * | 3/1992 | Hendrickson | ................. | 30/531 |
| 5,467,498 A * | 11/1995 | Keegan et al. | ........... | 15/236.05 |
| 5,964,035 A * | 10/1999 | Poehlmann | ................... | 30/161 |
| 6,481,041 B1 * | 11/2002 | Ingram | ........................ | 15/111 |
| 6,619,194 B1 * | 9/2003 | Kuan | ........................... | 99/588 |
| 2005/0217122 A1 * | 10/2005 | Murphy et al. | ............. | 30/279.6 |

* cited by examiner

*Primary Examiner*—Ghassem Alie
(74) *Attorney, Agent, or Firm*—Lempia Braidwood LLC

(57) ABSTRACT

An improved peeler or scraper is disclosed with a pivoting head that can be pivoted between a longitudinal position where the cutting or scrapping blade is in general alignment with the handle to a transverse position where the cutting blade is disposed perpendicular to the handle or in a "T" configuration.

27 Claims, 3 Drawing Sheets

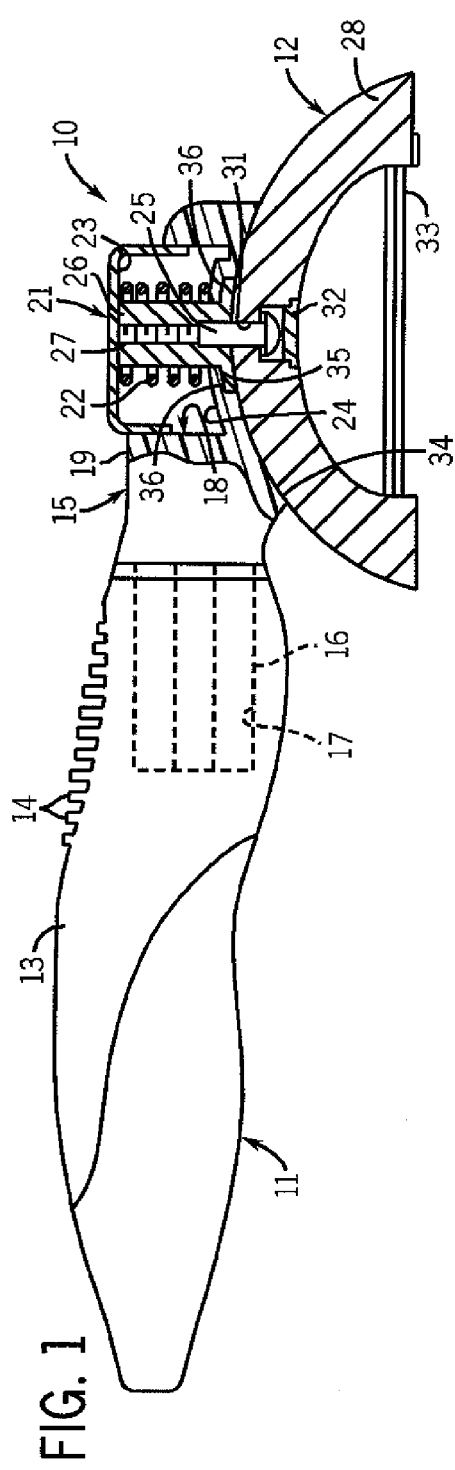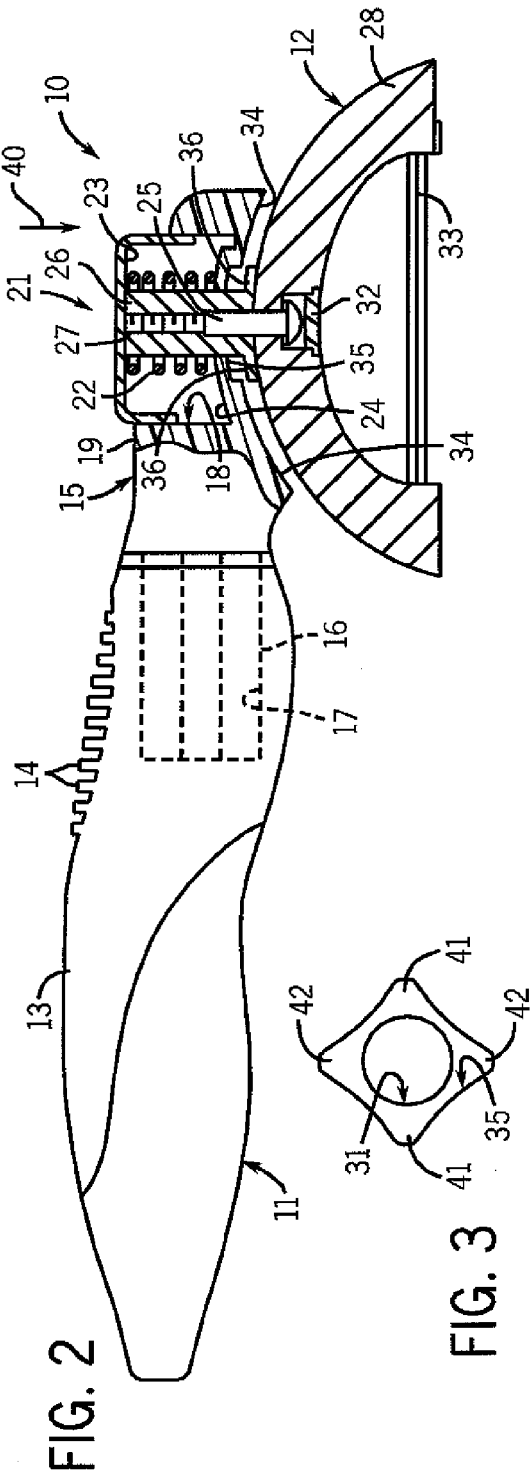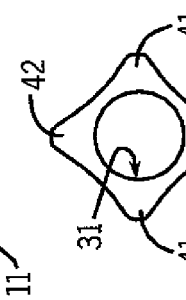

VEGETABLE PEELER WITH PIVOTING HEAD

CROSS-REFERENCE TO RELATED APPLICATION

This application claims the benefit under 35 U.S.C. § 119 (e) of U.S. Provisional Patent Application Ser. No. 60/493,553, filed Aug. 8, 2003, the disclosure of which is incorporated herein by reference.

BACKGROUND

1. Technical Field

An improved vegetable peeler is disclosed. More specifically, a vegetable peeler with a pivoting head is disclosed which enables the head to be positioned parallel to and in general alignment with the handle and at least one alternative position, such as at a 90° angle with respect to the handle.

2 Description of the Related Art

Vegetable peelers are generally available in two general configurations—either in general alignment with or parallel to the handle or disposed at a right angle or a 90° perpendicular angle to the handle. Thus, conventional peelers are configured so that the blade is oriented in the long direction or as an extension of the handle or in a "T" configuration with the blade cutting surface perpendicular to the handle.

Thus, if a consumer desires to have vegetable peelers with the blade oriented parallel or longitudinal with respect to the handle and perpendicular or in a "T" configuration with respect to the handle, the consumer must buy two separate peelers. Individual consumers tend to have uses for both types of peelers.

Accordingly, there is a need for a single peeler which could provide both configurations. Such a peeler would eliminate the need for a consumer to purchase and store two different peelers and eliminate the need for using two different peelers in a single cooking operation.

SUMMARY OF THE DISCLOSURE

In satisfaction of the aforenoted needs, an improved vegetable peeler, peeling mechanism or scraping mechanism is shown and described. The disclosed embodiments are applicable not only to vegetable peelers but peelers with other intended uses or devices where it is desirable to utilize the device with a cutting, peeling or scraping blade in at least two different positions with respect to the handle.

In an embodiment, a peeler is disclosed which comprises a handle pivotally connected to a head. The head has at least one peeling or scraping blade. The peeler further comprises a lock mechanism to releasably secure the head in one of at least two positions with respect to the handle. The head is movable between the at least one of two positions by releasing the lock mechanism and rotating the head.

In a preferred embodiment, the at least two positions of the head include a first position where the blade is parallel to the handle and a second position where the blade is generally perpendicular to the handle.

In a refinement, the lock mechanism comprises a detent and at least two recesses for receiving the detent when the head is in one of the at least two rotatable positions. Preferably, the lock mechanism further includes a spring for releasably biasing the detent in one of the recesses, depending upon the position in which the head is in.

The detent may be disposed in the head or in the handle and, consequently, the recess or recesses may also be disposed in the handle or the head, respectively. Preferably, if the recesses are disposed in the handle, the detent or detents are disposed in the head and vice versa.

In a refinement, the lock mechanism comprises an opening extending through a distal end of the handle. The opening having an upper end and a lower end. The upper end of the opening receiving a button and a lower end of the opening receiving a fastener that connects the head to the button. The lower end of the opening preferably extending through a shaped recess formed in a handle. The head further comprises a shoulder mateably received in the shaped recess wherein the downward pressure on the button releases the shoulder from the shaped recess thereby enabling rotation of the head from one of the positions to another of the positions where the shoulder is again received in the recess to releasably lock the head in the one of the positions.

In a further refinement of this concept, the button is biased towards the upper end of the opening so that the shoulder of the head is biased towards the shaped recess.

In another refinement of this concept, the button comprises a lower end comprising a cylindrical shaft that is connected to the fastener. The shaft extends through a spring that is trapped between an underside of the button and a handle for biasing the shoulder of the head towards the shaped recess.

In another refinement, the head comprises an arched frame with opposing ends with the peeling or scraping blade being connected to and extending between the opposing ends of the arched frame.

In another refinement, the cylindrical shaft of the button comprises an axial threaded opening and the fastener is a threaded fastener that is threadably received in the threaded opening to connect the head to the button.

In another refinement, the handle is connected to a connecting element that, in turn is connected to the head. The connecting element includes a top surface having an upper recess therein for receiving a button and an underside that faces the head. The head comprises a frame that is connected to the blade. Either the frame of the head or the underside of the connecting element has a shaped recess and the other of the frame or the underside of the connecting element has the shoulder for being mateably received within the shaped recess. Downward pressure on the button releases the shoulders from the shaped recess thereby enabling rotation of the head from one of the positions to another of the positions.

In a refinement, instead of a single shaped recess for permitting location of the head in two or more different positions, a plurality of different recesses may be used for receiving one or more detents. Again, the recesses may be disposed in the underside of the handle, an underside of the connecting element or on an upper portion of the frame of the head and the detent or detents may be disposed along an upper portion of the frame of the head or along an underside of the handle or connecting element.

In a refinement, the shaped recess is rectangularly shaped with two pairs of opposing corners and the detent mechanism comprises two pairs of opposing shoulders that are received in the pairs of opposing corners of the shaped recess thereby permitting the head to be rotated between a position parallel to the handle or position generally perpendicular to the handle.

The releasably locking mechanism for securing head in two or more positions with respect to the handle may include a spring-biased pin, pawl, finger, latch or similar elements that may be releasably received in a recess, slot or channel. A ratchet mechanism may also be used to rotatably connect the head to the handle.

The head may be connected to the button in a variety of means including a threaded fastener such as a screw or bolt or other more rigid connection.

The disclosed design, in addition to being particularly adaptable to vegetable peelers, would also be useful as a paint scraper. Of course, a different blade would be utilized for a paint scraper than for a vegetable peeler.

BRIEF DESCRIPTION OF THE DRAWINGS

The disclosed embodiments are illustrated more or less diagrammatically in the accompanying drawings, wherein:

FIG. 1 is a side and partial sectional view of a disclosed vegetable peeler;

FIG. 2 is another side and partial sectional view of the vegetable peeler disclosed in FIG. 1, illustrating the head in a depressed position prior to rotating the head to a different orientation with respect to the handle;

FIG. 3 is a partial bottom plan view of the handle portion of the peeler illustrated in FIGS. 1 and 2, particularly illustrating the recess in which the head of the peeler pivots;

DETAILED DESCRIPTION OF THE PRESENTLY PREFERRED EMBODIMENTS

Figures 4, 5, 6, 7, 8:
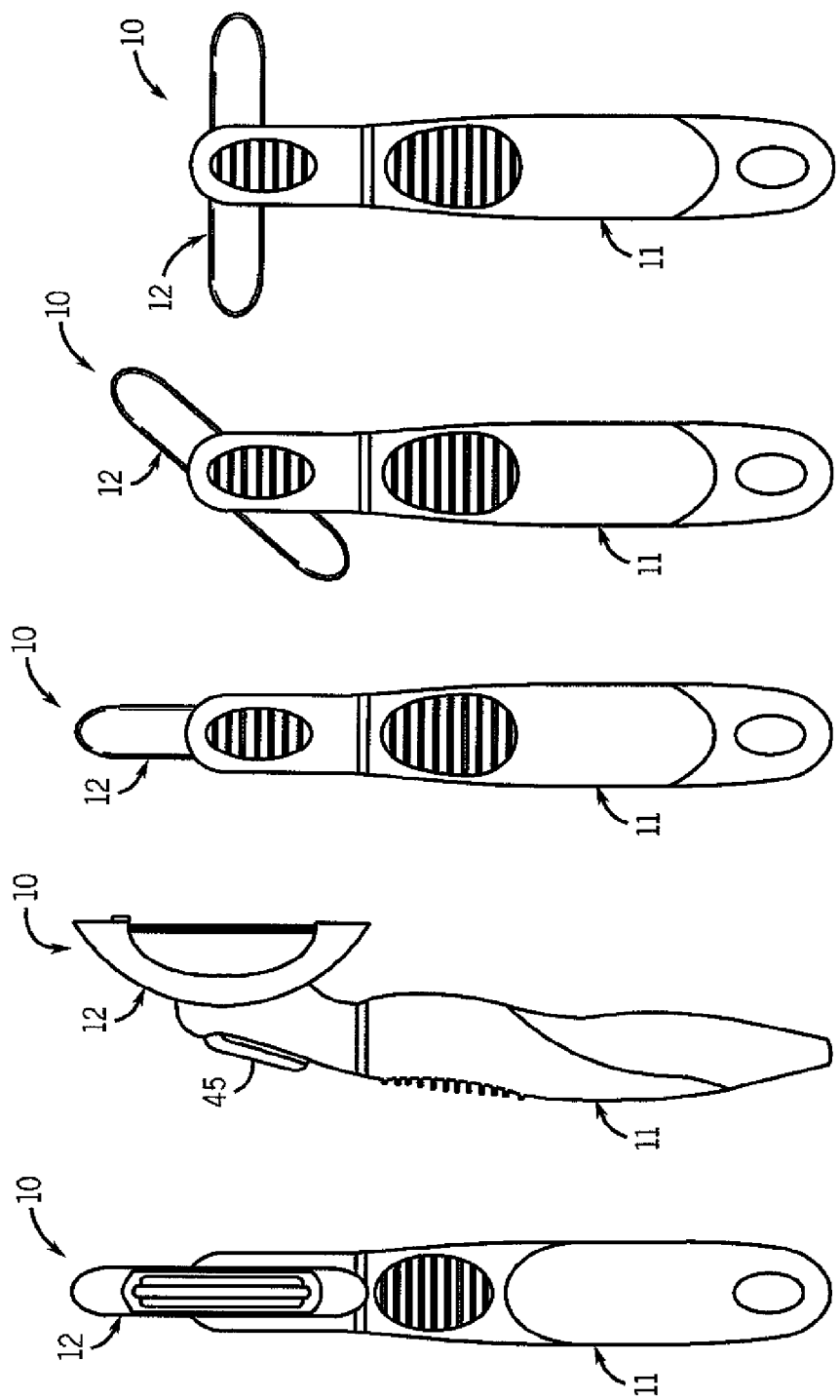
FIG. 4 is a bottom plan view of the peeler shown in FIGS. 1-3, with the head in a position aligned with the handle.
FIG. 5 is a side plan view of the peeler as shown in FIG. 4.
FIG. 6 is a top plan view of the peeler as shown in FIGS. 4-5.
FIG. 7 is a top plan view of the peeler with the head being pivoted between the position shown in FIGS. 4-6 and the position shown in FIG. 8.
FIG. 8 is a top plan view of the peeler as shown in FIGS. 1-7, with the head pivoted to a position where the blade is perpendicular to the handle.

Turning to FIG. 1, an improved vegetable peeler 10 is illustrated. The peeler 10 includes a handle 11 and a head 12. The handle 11 includes a grip portion 13 which may optionally include a plurality of transverse ribs shown at 14 for improved gripping action. The handle portion 11 may also include or be separately connected to a connecting element 15 which, in the embodiments shown in FIGS. 1-2, includes a shaped shaft 16 that is received within the complimentary shaped hole 17 in the handle portion 11. Other attachment mechanisms between the handle 11 and connecting element 15 will be apparent to those skilled in the art.

The connecting element 15 includes a recess 18 disposed in a top surface 19 thereof. The recess 18 accommodates a push button 21. A spring or biasing member 22 is trapped between an underside 23 of the push button 21 and a bottom surface 24 of the recess 18. The spring biases the push button 21 in the upward position as shown in FIG. 1.

The push button 21 is connected to the peeler head 12 by way of the screw shown at 25. Specifically, the underside 23 of the push button 21 is connected to a cylindrical shaft 26 which includes a threaded hole 27 for threadably receiving the screw 25.

The peeler head includes an arched frame 28 which is integrally connected to a cylindrical shaft 26. The arched frame 28 also includes an opening 31 for receiving the screw 25. To prevent food and liquid from engaging the screw 25 and possibly causing corrosion, a plug 32 may be employed as a barrier. The arched frame 28 is connected to the blade 33 in a conventional manner. The underside 34 of the connecting element 15 or handle 11 (if a unitary construction is used) also includes a shaped recess 35 which is also illustrated in FIGS. 2 and 3. The shaped recess 35 receives the shoulders 36 that extend upward from the arched frame 28 of the head 12.

Referring to FIGS. 2-3, to pivot the head 12 with respect to the handle 11, the consumer pushes the button 21 down in the direction of the arrow 40, thereby compressing the spring 22 and moving the shoulders 36 out of the shaped recess 35. Then, by applying a twisting force on the button 23 or simply grasping the arched frame 28 and twisting, the head 12 can be rotated in 90° increments thereby moving the head to a transverse position as shown in FIG. 8. A pair of shoulders shaped like the shoulders 36 shown in FIGS. 1-2 are also provided in the frame 28 or a 90° orientation with respect to the shoulders 36. One of the shoulders is shown in phantom at 38 in FIGS. 1-2.

Thus, to pivot the head 12, the push button 21 is pushed downward in the direction of the arrow 40 (see FIG. 2), thereby releasing the shoulders 36 from the shaped recess 35 (see FIGS. 2-3). Then, the head 12 is rotated by way of the button 21 or arched frame 28 until the shoulders 38 are in alignment with a corresponding pair of corners of the shaped recess 35 thereby moving the head 12 to the transverse position shown in FIG. 8. More specifically, referring to FIG. 3, the shaped recess 35 includes two pairs of opposing corners shown at 41, 42. In the position shown in FIG. 1, the shoulders 36 of the arched frame 28 are accommodated in the corners 41 of the shaped recess 35 (see FIG. 3). Meanwhile, the shoulders 38 of the arched frame 28 are accommodated in the corners 42. In contrast, in the position shown in FIG. 8, the shoulders 38 are accommodated in the corners 41 of the shaped recess 35 and the shoulders 36 are accommodated in the corners 42.

A shaped recess with four or more pairs of opposing corners could be provided for additional positions of the blade 33 with respect to the handle 11.

FIGS. 4-8 illustrate the rotation of the head 12 between the longitudinal position (FIG. 4) and a transverse position (FIG. 8). As shown in FIG. 5, the button 21 may also include an upwardly protruding rib 45 to facilitate the positioning of the head 12 between the position shown in FIG. 4 to the position shown in FIG. 8.

Figure 9:
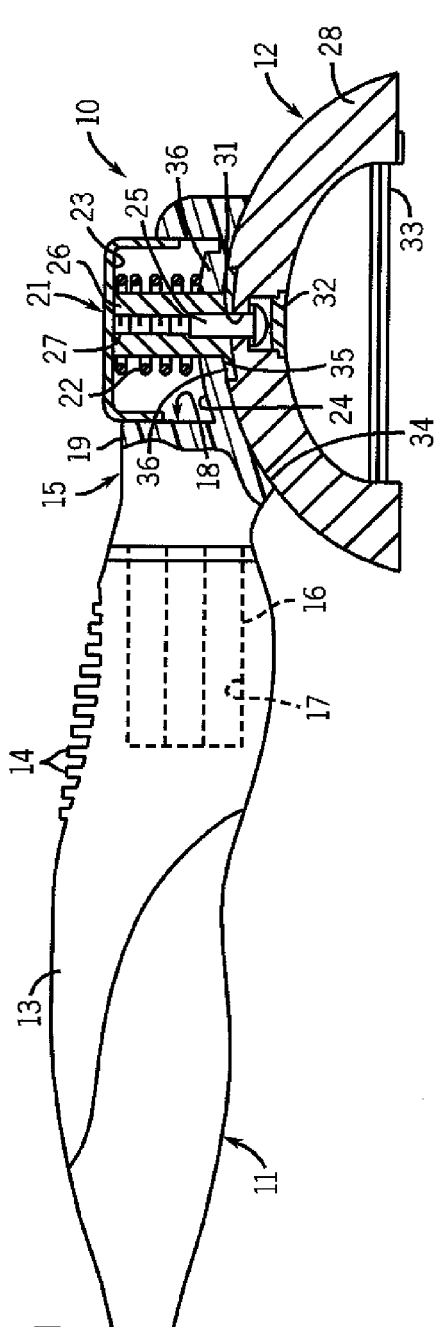
FIG. 9 is a side and partial sectional view of an alternative embodiment of a vegetable peeler.
Figure 10:
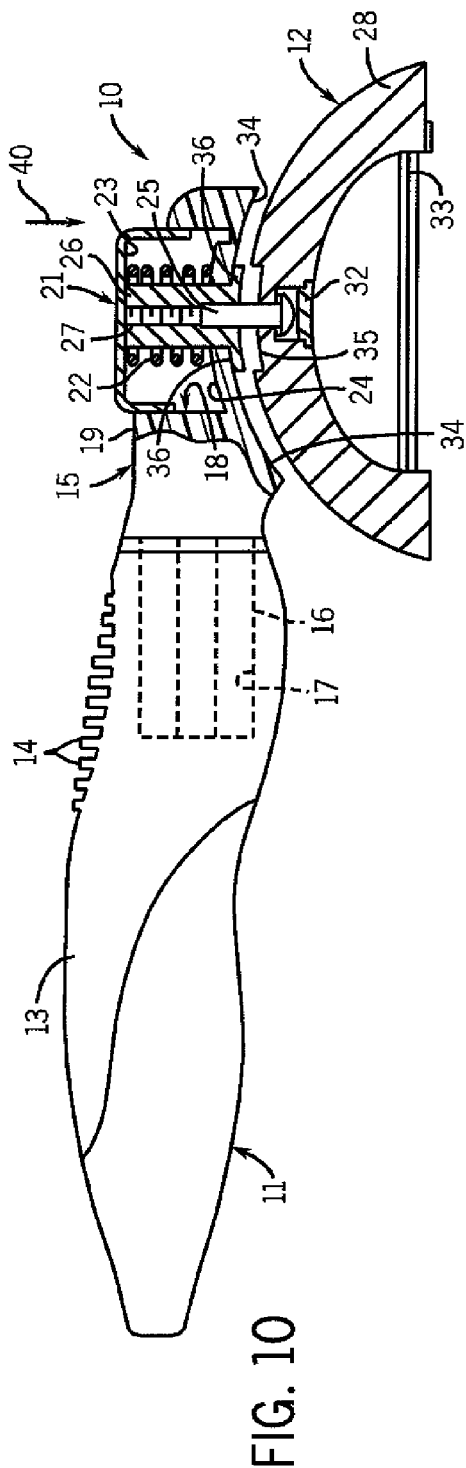
FIG. 10 is another side and partial sectional view of the vegetable peeler disclosed in FIG. 9, illustrating the head in a depressed position prior to rotating the head to a different orientation with respect to the handle.

As noted in FIGS. 9-10, the shaped recess 35 may be disposed in the head 12 and the shoulder or shoulders 36 may be disposed in the underside of the handle 11 or connecting element 15. Instead of utilizing the connecting element 15, a unitary construction for the handle 11 may be also be utilized. Further, in addition to the shoulder 36/recess 35 construction illustrated, other ball and detent, pawl and recess, spring bias pin, ratchet or other biased stop mechanism may be used to lock the head 12 in place with respect to the handle 11 in one or more different positions. Thus, instead of using a spring 22 to move the detents or shoulders 36 towards the recess 35 as shown in FIGS. 1 and 2 or a spring 22 to move a recess 35 towards the shoulders 36 as shown in FIGS. 9 and 10, a spring or other biasing element could be used to move the detent member 36 only. These and other alternatives will be apparent to those skilled in the art.

While certain embodiments have been disclosed and described, alternatives will be apparent to those skilled in the art and the present application and forthcoming patent is intended to cover all such equivalents that fall within the scope of the allowed claims.

What is claimed is:

1. A peeler comprising:

a head formed as an arched frame with opposed ends, the head having a top surface and at least one peeling or scraping blade connected to and extending between the opposed ends to be spaced from and below the top surface;

a handle pivotally connected to the head, the handle having a distal end including an upper surface and a lower surface being arched for abuttingly engaging the arched frame of the head, wherein the top surface of the head normally engages the lower surface of the handle; and a lock mechanism on the top surface of the head and the lower surface of the handle to releasably secure the head in one of at least two positions with respect to the handle, wherein the head is connected to the handle so that the opposed ends of the head extend toward a work surface in a direction substantially perpendicular to the handle so that the blade lies within a plane spaced from and below the handle to be substantially aligned with the handle in a first position and substantially perpendicular to the handle in a second position, the head being movable between the at least two positions by releasing the lock mechanism and rotating the head, the lock mechanism further including a biased stop mechanism located on and movable within the top surface of the handle and connected to the head, the stop mechanism being biased by a spring device located between the stop mechanism and the handle, the stop mechanism being operable to release the lock mechanism by disengaging the top surface of the head from contact with the lower surface of the handle.

2. The peeler of claim 1 wherein the lock mechanism comprises at least one detent, a recess configured for receiving the at least one detent when the head is in either one of the at least two positions, and the spring device for releasably biasing the at least one detent in the recess.

3. The peeler of claim 2 wherein the detent is disposed on the top surface of the head and the recess is disposed on the tower surface of the handle.

4. The peeler of claim 2 wherein the detent is disposed on the handle and the recess is disposed in the head.

5. The peeler of claim 1 wherein the stop mechanism comprises a button movable within a recess formed in the upper surface of the handle, a fastener connecting the button to the head, and a shaped recess in the lower surface of the handle, the head further comprising a shoulder on the top surface of the head and mateably received in the shaped recess, wherein downward pressure on the button releases the shoulder from the shaped recess thereby enabling rotation of the head from one of the positions to another of the positions where upon release of the button the shoulder is again received in the shaped recess to releasably lock the head in one of the positions.

6. The peeler of claim 5 wherein the button is biased towards the upper surface of the handle so that the shoulder of the head is biased towards the shaped recess.

7. The peeler of claim 5 wherein the button includes a cylindrical shaft connected to an underside of the button, the cylindrical shaft cooperating with the fastener to connect the button to the head, and the spring device surrounding the cylindrical shaft and trapped between the underside of the button and the handle for biasing the shoulder of the head towards the shaped recess.

8. The peeler of claim 7 wherein the cylindrical shaft comprises an axial threaded opening and the fastener is a threaded fastener connected at one end to the head and threadably received at an opposite end in the threaded opening.

9. The peeler of claim 1 wherein a connecting element forms the distal end of the handle, wherein the upper surface of the connecting element includes a recess therein for receiving a button, wherein either the frame of the head or the lower surface of the connecting element includes a shaped recess and the other of the frame or the lower surface of the connecting element includes a shoulder for being mateably received in the shaped recess, wherein downward pressure on the button releases the shoulder from the shaped recess thereby enabling rotation of the head from one of the positions to another of the positions.

10. The peeler of claim 1 wherein the stop mechanism comprises a button movable within a recess formed in the upper surface of the distal end of the handle, and a fastener connecting the button to the head, the lower surface of the distal end of the handle further comprising a recess arrangement, the head further comprising a shoulder mateably received in the recess arrangement when the head is in a first position and received in a different position in the recess arrangement when the head is in a second position, wherein downward pressure on the button releases the shoulder from the recess arrangement thereby enabling rotation of the head between the first to the second position.

11. The peeler of claim 10 wherein the button is biased towards the upper surface of the handle so that the shoulder of the head is biased towards the recess arrangement.

12. The peeler of claim 10 wherein the button includes a cylindrical shaft connected to an underside of the button, the cylindrical shaft cooperating with the fastener to connect the button to the head, the spring device surrounding the cylindrical shaft and trapped between the underside of the button and the handle for biasing the shoulder of the head into the recess arrangement.

13. The peeler of claim 12 wherein the cylindrical shaft comprises an axial threaded opening and the fastener is a threaded fastener connected at one end to the head and threadably received at an opposite end in the threaded opening.

14. The peeler of claim 1 wherein the head is connected to the handle through a connecting element forming the distal end of the handle, the connecting element having an upper recess in the upper surface therein for receiving a button and a through opening therein extending through the lower surface and into the upper recess, the lower surface of the connecting element comprising an arched surface, and a shaped recess disposed in the arched surface, the shaped recess comprising two pairs of opposing corners, the arched frame of the head and arched surface of the connecting element being in abutting engagement with each other, the head comprising two pairs of shoulders that are mateably received in the shaped recess of the connecting element, wherein downward pressure on the button releases the shoulders from the shaped recess thereby enabling rotation of the head from one of the positions to another of the positions.

15. A peeler or scraper comprising:

a head formed as an arched frame with opposed ends, the head having a top surface and at least one peeling blade connected to and extending between the opposed ends to be spaced from and below the top surface;

a handle pivotally connected to the head, the handle having a distal end including an upper surface and a lower surface being arched for abuttingly engaging the arched frame of the head, wherein the top surface of the head normally engages the lower surface of the handle; and a spring biased lock mechanism on the top surface of the head and the lower surface of the handle to releasably secure the head in one of at least two positions with respect to the handle, wherein the head is connected to the handle so that the opposed ends of the head extend toward a work surface in a direction perpendicular to the handle so that the blade lies within a plane spaced from and below the handle to be substantially aligned with the handle in a first position and substantially perpendicular to the handle in a second position, the head being movable between the at least two positions by overcoming the spring bias of the lock mechanism and rotating the head from a position parallel with the handle to a position perpendicular to the handle, the lock mechanism further including a biased stop mechanism located on and movable within the top surface of the handle and connected to the head, the stop mechanism being biased by a spring device located between the stop mechanism and the handle, the stop mechanism being operable to release the lock mechanism by disengaging the top surface of the head from contact with the lower surface of the handle.

16. The peeler or scraper of claim 15 wherein the lock mechanism comprises a detent and a recess arrangement for receiving the detent in one of the at least two positions and the spring device for releasably biasing the detent in the recess arrangement.

17. The peeler or scraper of claim 16 wherein the detent is disposed on the top surface of the head and the recess arrangement is disposed on the lower surface of the handle.

18. The peeler or scraper of claim 16 wherein the detent is disposed on the handle and the recess arrangement is disposed in the head.

19. The peeler or scraper of claim 15 wherein the stop mechanism comprises a button movable within a recess formed in the upper surface of the handle, a fastener connecting the button to the head, and a shaped recess in the lower surface of the handle, the head further comprising a shoulder on the top surface of the head and mateably received in the shaped recess, wherein downward pressure on the button releases the shoulder from the shaped recess thereby enabling rotation of the head from one of the positions to another of the positions where upon release of the button the shoulder is again received in the shaped recess to releasably lock the head in one of the positions.

20. The peeler or scraper of claim 19 wherein the button includes a cylindrical shaft connected to an underside of the button, the cylindrical shaft cooperating with the fastener to connect the button to the head, and the spring device surrounding the cylindrical shaft and trapped between the underside of the button and the handle for biasing the shoulder of the head into the shaped recess.

21. The peeler or scraper of claim 20 wherein the cylindrical shaft comprises an axial threaded opening and the fastener is a threaded fastener connected at one end to the head and threadably received at an opposite end in the threaded opening.

22. The peeler or scraper of claim 21 wherein the button is biased towards the upper surface of the handle so that the shoulder of the head is biased towards the shaped recess.

23. The peeler or scraper of claim 15 wherein the lock mechanism comprises an opening extending though a distal end of the handle, the opening having an upper end and a lower end, the upper end of the opening receiving a button, the lower end of the opening receiving a fastener that connects the head to the button, the distal end of the handle farther comprising an underside with at least one shoulder fanned thereon, the head further comprising a shaped recess for incapably receiving the shoulder of the handle, wherein downward pressure on the button releases the shoulder from the shaped recess thereby enabling rotation of the head from one of the positions to another of the positions where the shoulder is again received in the shaped recess to releasably lock the head in the other of the positions.

24. The peeler or scraper of claim 23 wherein the button comprises a lower end including a cylindrical shaft that is connected to the fastener, the shaft extending through a spring that is trapped between an underside of the button and the handle for biasing the shoulder of the handle into the shaped recess.

25. The peeler or scraper of claim 24 wherein the cylindrical shaft comprises an axial threaded opening and the fastener is a threaded fastener that is threadably received in the threaded opening.

26. The peeler or scraper of claim 25 wherein the button is biased towards the upper end of the opening so the shoulder of the handle is biased towards the shaped recesses.

27. A paint scraper comprising:
a head formed as an arched frame with opposed ends, the head having a top surface and including at least one scraping blade connected to and extending between the opposed ends to be spaced from and below the top surface;
a handle pivotally connected to the head, the head including an upper surface and a lower surface being arched for abuttingly engaging the arched frame of the head, wherein the top surface of the head normally engages the lower surface of the handle; and
a lock mechanism on the top surface of the head and the lower surface of the handle to releasably secure the head in one of at least two positions with respect to the handle, wherein the head is connected to the handle so that the opposed ends of the head extend toward a work surface in a direction substantially perpendicular to the handle so that the blade lies within a plane spaced from and below the handle to be substantially aligned with the handle in a first position and substantially perpendicular to the handle in a second position, the head being movable between the at least two positions by releasing the lock mechanism and rotating the head, the lock mechanism further including a biased stop mechanism located on and movable within the top surface of the handle and connected to the head, the stop mechanism being biased by a spring device located between the stop mechanism and the handle, the stop mechanism being operable to release the lock mechanism by disengaging the top surface of the head from contact with the lower surface of the handle.

* * * * *

UNITED STATES PATENT AND TRADEMARK OFFICE
CERTIFICATE OF CORRECTION

PATENT NO. : 7,415,769 B2
APPLICATION NO. : 10/891670
DATED : August 26, 2008
INVENTOR(S) : W. Scott Hughes It is certified that error appears in the above-identified patent and that said Letters Patent is hereby corrected as shown below:

In the claims:
Column 8
claim 23, line 6, please delete "farther" and replace with -- further --
Column 8
claim 23, line 7, please delete "fanned" and replace with -- formed --
Column 8
claim 23, line 9, please delete "incapably" and replace with -- mateably --

Signed and Sealed this

Fourth Day of November, 2008

JON W. DUDAS
*Director of the United States Patent and Trademark Office*